United States Patent [19]

Kirven

[11] Patent Number: 4,471,530
[45] Date of Patent: Sep. 18, 1984

[54] APPARATUS AND METHOD OF MEASURING SURFACE HEIGHTS

[75] Inventor: William T. Kirven, Pomona, Calif.

[73] Assignee: Kalman Floor Company, Evergreen, Colo.

[21] Appl. No.: 420,901

[22] Filed: Sep. 21, 1982

[51] Int. Cl.³ ............................................ G01B 11/24
[52] U.S. Cl. .................................. 33/174 R; 33/293; 33/286; 33/174 P
[58] Field of Search ................. 33/286, 287, 1 H, 227, 33/228, 293, 343, 174 R, 174 L, 174 P; 356/247, 248, 153, 154, 148; 73/105, 146

[56] References Cited

U.S. PATENT DOCUMENTS

| | | | |
|---|---|---|---|
| 1,967,758 | 7/1934 | Pierce | 33/174 R |
| 2,316,951 | 4/1943 | Grauer | 33/23 C |
| 3,056,209 | 10/1962 | Oliver | 33/174 P |
| 3,208,151 | 9/1965 | Rawstron | 33/174 P |
| 3,222,787 | 12/1965 | Young | 33/174 R |
| 3,462,845 | 8/1969 | Matthews | 33/291 X |
| 3,470,739 | 10/1969 | Takafuji et al. | 33/174 P X |
| 3,639,993 | 2/1972 | Sarturio | 33/174 R |
| 3,675,545 | 7/1972 | Anderson et al. | 33/174 R X |
| 3,887,012 | 6/1975 | Scholl et al. | 356/138 X |
| 3,940,855 | 3/1976 | Nooy et al. | 33/174 L |
| 4,274,205 | 6/1981 | Starr et al. | 33/174 L |

Primary Examiner—Harry N. Haroian
Attorney, Agent, or Firm—Hubbard & Stetina

[57] ABSTRACT

An improved apparatus and method for measuring surface heights is disclosed which yields a true height profile of the surface being measured. The apparatus and method is adapted to provide a straight and preferably level reference datum adjacent to the measured surface from which height and slope variation along the measured surface are automatically sensed, recorded and plotted. Three structural embodiments of the apparatus of the present invention are disclosed which permit either separate or simultaneous transverse or longitudinal surface data to be obtained during operation.

4 Claims, 7 Drawing Figures

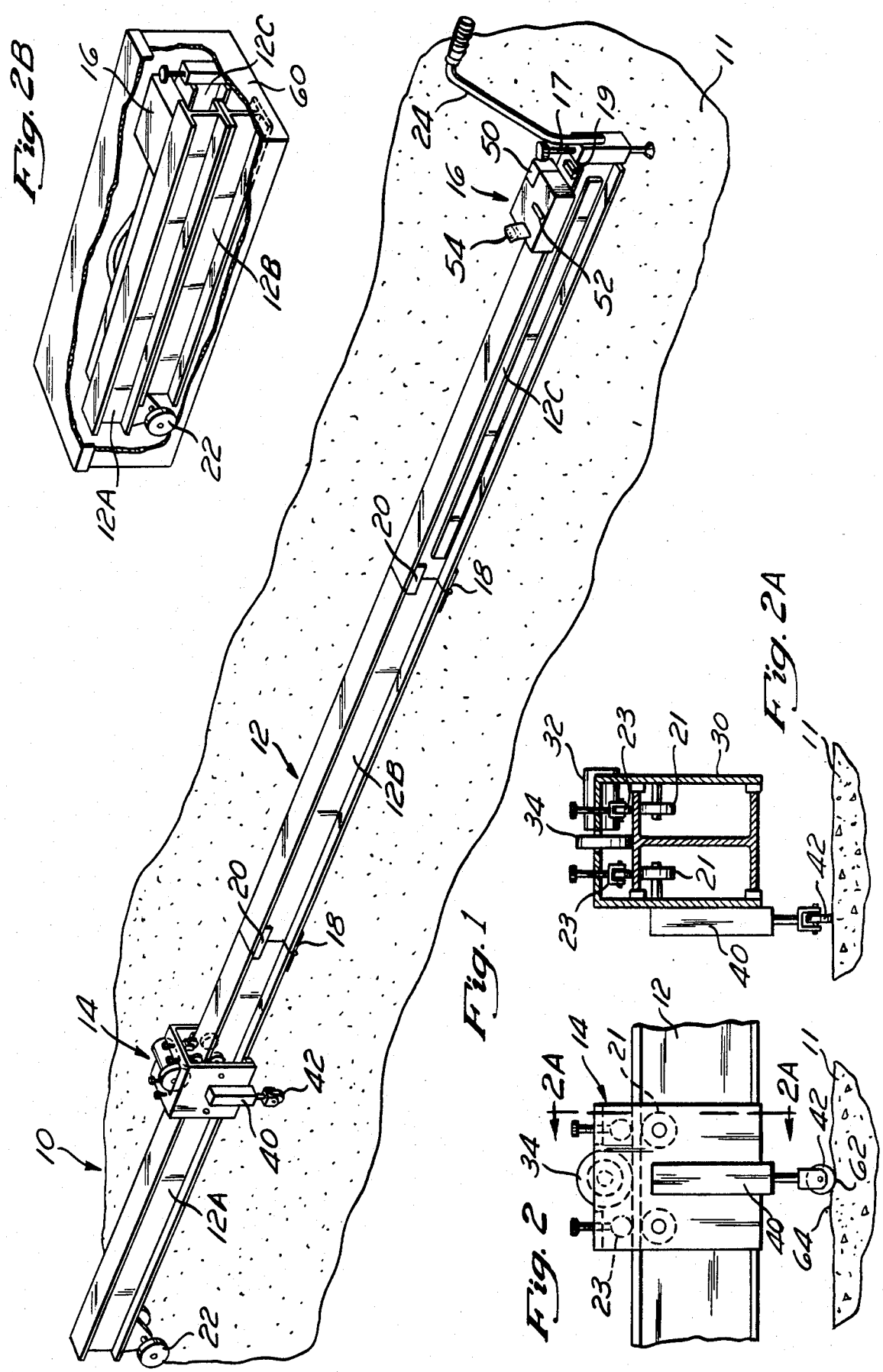

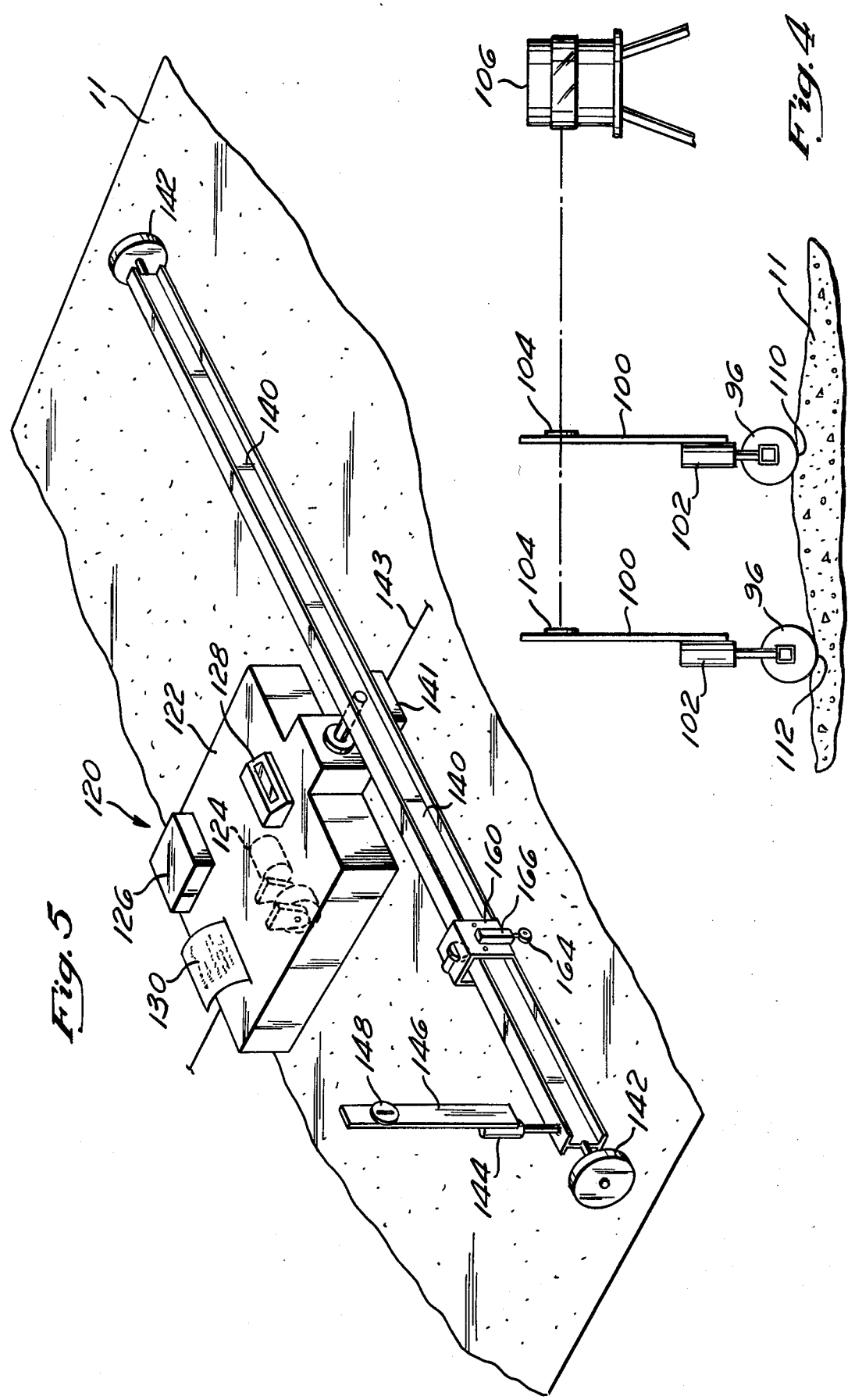

APPARATUS AND METHOD OF MEASURING SURFACE HEIGHTS

BACKGROUND OF THE PRESENT INVENTION

The present invention relates to surface gauges and, more particularly, to an improved apparatus and method for measuring concrete surface heights.

In recent years, the concrete floor industry has experienced an increasing demand for extremely flat floors (genericly known as superflat floors) suitable for automated high level warehousing applications wherein floor surface height deviations often cause vibrational damage to automated fork and turret trucks traveling upon the floor and pose reduced productivity to stacking cranes installed within the warehouse. To meet this increasing demand, the industry is currently attempting to adopt standards and specifications for floor flatness as well as establish apparatus and methods suitable for measuring floor flatness to insure compliance of such existing and future standards.

Heretofore, two basic categories of prior art apparatus and methods for measuring floor flatness have been utilized in the art, i.e. manual systems and semi-automatic systems. The manual systems have typically comprised either an engineer's level and rod apparatus or a level straight edge with scales mounted to the straight edge at right angles; whereby floor measurements indicated on the rod or from the scales could be obtained and manually plotted. The more recent semi-automatic systems have generally comprised apparatus having a pair of spaced wheels adapted to travel along a selective path of a concrete floor surface and including a sensor adapted to measure the height differential between the two wheels along the concrete floor. Examples of such prior art semi-automatic systems are the Analog Profileograph ™ apparatus manufactured by Edward W. Face Company and an analog measuring apparatus manufactured by Mr. Ralph McLean of Fullerton, Calif.

Although such prior art manual and semi-automatic measuring systems have proven generally effective in the past, they possess inherent deficiencies which detract from their overall effectiveness and widespread use in the industry.

In relation to the manual prior art systems, the foremost deficiency has been the extreme labor intensiveness of conducting measurements, often requiring a pair of skilled surveyors to be maintained upon the job site for prolong duration. Further, such manual systems, although providing a true height reading along the floor surface, have necessitated the accumulation of height readings at only selected locations on the floor surface, with later interpolation of the measurement data to derive a height profile for the entire surface area of the floor. As will be recognized, such interpolation inherently introduces inaccuracies into the measurement results which in superflat floor applications is oftentimes unacceptable. The prior art semi-automatic systems, although typically not requiring significant interpolation of data results, have proven to be extremely expensive and, further, have additionally required skilled operating technicians to be utilized upon the job site. Further, such semi-automatic systems have heretofore failed to provide a true height profile of the floor surface, but rather have only yielded a relative height differential throughout the surface area of the floor. Likewise, current semi-automatic devices pose many anomalies associated with the data representation of absolute surface heights. In addition, such systems have similarly failed to permit the slope or level measurements of the floor to be determined.

Thus, there exists a substantial need in the art for an improved measurement apparatus and method for measuring surface heights which automatically provides accurate, true height profile and slope data for concrete floor surfaces without the need of utilizing skilled labor.

SUMMARY OF THE PRESENT INVENTION

The present invention specifically addresses and alleviates the above-referenced need in the prior art by providing an improved method and apparatus for measuring surface heights which yields a true height profile of the surface being measured.

More particularly, the present invention discloses three structural embodiments of apparatus for accurately measuring height deviations upon a surface such as concrete floors; the first comprising a semi-automatic sensor beam apparatus capable of providing a true height surface profile along a single coordinate axis, the second comprising a fully automatic transport trolley measurement apparatus capable of providing a true height surface profile along one or more parallel coordinate axis, and the third comprising a fully automatic transport trolley measurement apparatus capable of providing a true height surface profile along a pair of perpendicular coordinate axis.

The semi-automatic sensor beam embodiment of the present invention comprises a rigid beam supported upon the measurement surface at opposite ends and including means to permit the rapid leveling of the beam into a level horizontal plane or axis. A height sensor is carried for transport along the beam and is adapted to contact the measurement surface. The sensor and transport mechanism generate height and position signals which may be processed by a microprocessor and printed or plotted to yield a true height profile of the measurement surface throughout the length of the beam.

The fully automatic single axis transport trolley embodiment of the present invention comprises the use of a trolley having a pair of wheels adapted to contact and travel upon the surface to be measured. A pair of optical sensors are mounted upon servo-units attached adjacent each of the contact wheels and are adapted to track an optical beam utilized to generate a reference plane, axis or datum. During travel of the trolley along the surface, variations in the surface height from the optical reference plane are detected by the optical sensors which output signals may be similarly processed to print and plot the true height profile of the measured surface.

The fully automatic dual axis transport trolley apparatus of the present invention similarly comprises a trolley which may be transported along the length of the surface to be measured and basically combines the structure of the semi-automatic beam sensor and fully automatic single axis embodiments to permit in a step and repeat fashion, simultaneous sensing, printing, and plotting of the true surface height profile along both a transverse and longitudinal coordinate axis.

All of the structural embodiments of the present invention are readily portable in nature and are designed for battery operation thereby being extremely suited for construction applications. In addition, all of the structural embodiments of the present invention are specifically designed to permit rapid and accurate operation by unskilled labor. Further, all of the embodiments permit programming options on the microprocessor such as user selected measurement intervals, offset and scale factors on measured data, mathematical data analysis, etc.

DESCRIPTION OF THE DRAWINGS

These as well as other features of the present invention will become more apparent upon reference to the drawings, wherein:

FIG. 1 is a perspective view of the semi-automatic sensor beam embodiment of the present invention;

FIG. 2 is a fragmented elevational view of the sensor beam embodiment of the present invention illustrating the position of the height sensor located thereon;

FIG. 2A is a cross-sectional view taken about lines 2A—2A of FIG. 2;

FIG. 2B is a perspective view of the sensor beam embodiment of the present invention collapsed into a portable configuration;

FIG. 4 is a side-elevational view of the embodiment of FIG. 3 illustrating the sensor and servo mechanism located upon the trolley; and FIG. 5 is a perspective view of the fully automatic dual axis transport trolley embodiment of the present invention.

DETAILED DESCRIPTION OF THE PREFERRED EMBODIMENT

First Embodiment

Rigid Beam and Sensor

Figure 3:
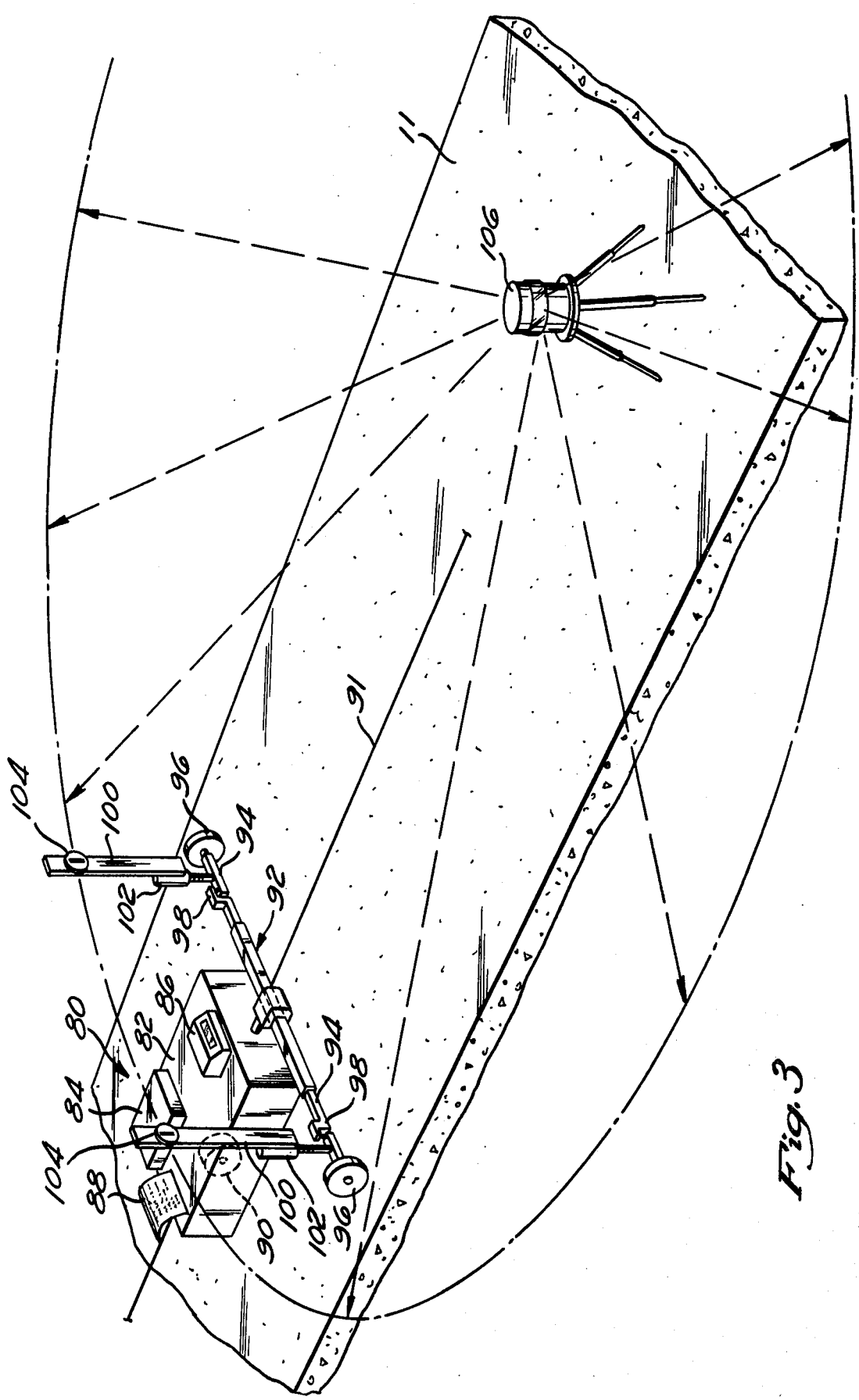
FIG. 3 is a perspective view of the fully automatic single axis transport trolley embodiment of the present invention.

Referring particularly to FIGS. 1 through 2B, there is shown the first embodiment of the improved apparatus 10 for measuring surface heights composed generally of an elongate beam 12, sensor mechanism 14, and controller 16. The beam 12 is preferably fabricated of 4 inch by 3 inch by 11 foot anodized aluminum I-beam stock adapted to resist corrosion caused by cement slurry and outdoor environments. The beam 12 is preferably formed in three separate beam sections 12A, 12B, and 12C which are interconnected along their lowermost surface by suitable loose pin hinges 18 and adapted to be rigidly locked in a coaxial orientation by plural cam lock fasteners 20 located adjacent the upper surface of each of the beam segments.

A transport wheel 22 is provided on one of the distal ends of the beam 12 while the opposite end of the beam 12 includes a transport handle 24 detachably mounted thereto. As will be recognized, by use of the transport wheel 22 and handle 24, an operator (not shown) may rapidly transport the assembled beam 12 to a desired location upon the surface to be measured; which by way of example and not limitation, comprises a concrete floor surface 11. The opposite end of the beam 12 is additionally provided with a leveling screw 17 sized to contact the concrete surface 11 and support the beam 12 at a predetermined height thereabove. A precision level 19 is further included to enable the assembled beam 12 to be leveled within close tolerances upon the concrete floor surface 11.

The sensor mechanism 14 includes a saddle or trolley 30 which is journaled to the upper and lower surfaces of the beam 12 by suitable plural bearing 21 and 23 to enable the saddle 30 to be transported along the length of the beam 12. A friction drive motor 32 is rigidly mounted to the saddle 30 and adapted to transport the saddle 14 throughout the length of the beam 12. The motor 32 is provided with a suitable position encoder 34 which as is well known, generates a digital signal in response to travel of the saddle 14 along the length of the beam 12.

A sensor 40 having a contact wheel 42 adapted to engage the concrete surface 11 desired to be measured is carried by the saddle assembly 14. The sensor 40 is designed to sense the deviations in the height of the concrete surface 11 and provide a variable signal corresponding to the magnitude of the sensed surface deviations. Although there are a variety of suitable sensors available for this purpose, the applicant has found that linear variable differential transformers (LVDT) or linear quadrature optical encoders (LQOE) are preferable.

The controller 16 is rigidly affixed to one end of the rigid beam 12. Preferably, the controller 16 includes a suitable microprocessor 50 such as an 8-bit CMOS microprocessor system manufactured by National Semi-Conductor Part. No. N8C80C which may be programmed to process the digital signals received from the position encoder 34 and digital or analog digital sensor 40 to derive surface heighth and beam location measurement values. A conventional digital readout 52 and printer/plotter 54 is additionally provided to permit a visual display and graphic record of the true height profile of the concrete surface 11 along the distance of the beam 12.

With the structure defined, the operation of the first embodiment of the present invention may be described. Typically, the appratus 10 is initially transported to the construction site in a collapsed configuration carried within a rugged case 60, with the beam section 12A, 12B, and 12C being subsequently assembled together by way of the loose pin hinges 18 and cam lock fasteners 20 to form the rigid beam structure 12. With the beam 12 assembled in this manner, the operator (not shown) transports the beam 12 via the transport wheel 22 and handle 24 to the precise location upon the concrete surface 11 desired to be measured and preferably positions the beam 12 in a level horizontal plane by adjustment of the leveling screw 17 and precision level 19. Although theoretically the beam 12 does not need to be leveled, the data collected on a first measuring run would not correlate to data collected on following contiguous measurement runs unless all measurement runs were made at level beam conditions. Thus, once leveled, it will be recognized that the beam 12 establishes a level reference line or axis located above the surface 11 to be measured.

To initiate the measurement procedure, the trolley 14 is positioned adjacent the controller 16 and the sensor wheel 42 of the sensor 40 is positioned to contact the concrete surface 11. Activation of the transport motor drive 32 of the saddle 14 causes the saddle 14 to be transported longitudinally along the length of the beam 12 from the controller 16 toward the transport wheel 22. During this transport of the saddle 14, the encoder 34 provides a digital signal to the microprocessor 50 to indicate the position of the saddle 14 along the length of the beam 12 which is advantageously processed, recorded, and displayed on the printer/plotter 54 and digital display 52, respectively. Simultaneously, during the transport of the saddle 14, the sensor wheel 42 of the sensor 40 contacts the concrete surface 11 and senses the height of the concrete surface from the beam 12. As best depicted in FIG. 2, upon encountering a depression 62 of protrussion 64, the sensor wheel 42 reciprocates vertically downward or upward respectively, whereby the sensor 40 responsive to movement of the sensor wheel 42 generates a corresponding signal to the microprocessor 50 which similarly is recorded and displayed on the printer/plotter 54 and digital display 52. Further, by programming the microprocesor 50, user selected measurement intervals, offset and scale factors and mathematical data analysis can be readily accomplished.

Thus, as well be recognized, throughout the travel of the saddle 14 along the length of the beam 12, true height deviations as opposed to relative deviations in the concrete surface 11 are automatically sensed and plotted thereby enabling suitable grinding or filling procedures to be subsequently initiated at specific locations along the concrete surface 11 to yield a superflat surface.

Second Embodiment

Fully Automatic Single Axis Transport Trolley Apparatus

Referring to FIGS. 3 and 4, the second embodiment of the present invention is depicted which comprises a fully automatic single coordinate axis measuring device 80. As shown, the device 80 is composed of a trolley 82 which as with the first embodiment of the present invention, is provided with a microprocessor 84, digital display 86, and printer/plotter 88. The trolley 82 is adapted to be positioned upon the concrete surface 11 desired to be measured and be transported there along as by way of a transport drive mechanism 90 (indicated by the phantom lines in FIG. 3). An axle assembly 92 is secured to the frontal portion of the trolley housing 82 and is preferably formed of a pair of telescoping tubular members 94 which may be axially reciprocated throughout a short distance to vary the track width of the axle assembly 92.

A pair of contact wheels 96 are mounted on opposite ends of the axle assembly 92 and are adapted to contact and ride upon the concrete surface 11 desired to be measured. Preferably, the contact wheels 96 are mounted to the telescoping members 94 of the axle assembly 92 by a suitable suspension 98 adapted to permit vertical movement of the contact wheels 96 relative to the axle assembly 94 yet prevent any canting or angular deflection of the wheels 96 relative to the axle assembly 92.

A pair of target rods 100 extending in a vertical orientation cooperate with a respective servo-mechanism 102 each rigidly mounted to the portion of the telescoping members 94 located outboard of the suspensions 98 so as to be in close proximity to contact wheels 96. Although a variety of servo-mechanisms 102 may be utilized, the application has found that lead screw servo-mechanisms or taunt band servo-mechanisms are preferred candidates. The uppermost portion of the target rods 100 is provided with an optical detector 104 designed to sense a collimated light beam source such as that eminating from a laser head 106 and generate a digital output used to command the servo-mechanisms 104. Such optical detectors 104 and light source 106 systems are available from various manufacturers, one such system being an EL1 optical level manufactured by Spectro Physics Inc. An advantageous characteristic of such an optical level 106 is that it produces a self-leveling collimated light source in a 360° swept pattern to thereby yield a highly accurate level optical reference plane.

In operation of the second embodiment of the present invention, the trolley 80 is carried to the particular job site and placed upon the concrete surface 11 desired to be measured. Subsequently, the optical light source 106 is similarly positioned on the concrete surface 11 and leveled such that the optic beam eminating from the source 106 defines a level optical reference plane (indicated by the phantom lines in FIG. 3) spaced vertically above the concrete surface 11. The servo-mechanism 102 are subsequently energized into a hunt operational mode whereby the target rods 104 are correspondingly raised or lowered until the optical reference plane is accurately registered with both of the detectors 104 mounted upon the target rods 100.

Upon sensing of the optical reference plane by the detectors 104, the measurement run of the concrete surface 11 may be initiated with the activation of the transport motor 90 causing the trolley 80 to be transported longitudinally along the length of the concrete surface 11 preferably in a direction away from the source 106 and along a guide wire 91. During this transport, variances in the concrete surface 11 such as protrussion 110 or depression 112 (shown in FIG. 4) are directly transmitted to the target rods 100 via the contact wheels 96 causing a corresponding upward or downward vertical travel, respectively, of the target rods 100. The operation of the detectors 104 positioned upon the target rods 100 is such that during such vertical travel of one or both of the rods 100, a signal is applied to the respective servomechanism 102 causing the servo-mechanism 102 to activate and whereby the target rods 100 will be correspondingly vertically lowered or raised respectively such that the detectors 104 will remain registered with the optical reference plane. This same signal is applied to the microprocessor 84 to permit recording of the true height variation of the concrete surface 11 upon the digital display 86 and printer/plotter 88. Simultaneously, the position of the trolley 82 upon the length of the concrete surface 11 is supplied to the microprocessor 84 via the transport mechanism and decoder 90 whereby a true profile of the surface height of the concrete 11 may be obtained.

The applicant has found that by use of the second embodiment of the present invention, continuous measurement runs up to approximately 200 feet long may be accurately and automatically accomplished.

Third Embodiment

Fully Automatic Dual Plane Apparatus

Referring to FIG. 5, the third embodiment of the measuring apparatus of the present invention is depicted. Basically, the third embodiment combines the structure of the first and second embodiment of the present invention to permit automatic measuring of a concrete surface 11 simultaneously in a step and repeat fashion in both a longitudinal and transverse direction.

As will be recognized, the device 120 of the third embodiment of the present invention includes a trolley 122 having a transport drive 124 (indicated by phantom lines in FIG. 5), microprocessor 126, digital display 128, and plotter/printer 130, the operation of which is analgous to that described in relation to the second embodiment of the present invention. In contrast to the second embodiment, however, the telescoping axle assembly is replaced by a rigid I-beam structure 140 analgous to the rigid beam 12 of the first embodiment of the present invention which is rigidly attached to the frontal surface of the trolley 122 and includes a pair of contact wheels 142. In addition, only a single servo-mechanism 144, target rod 146, and optical detector 148 are mounted adjacent one end of the beam 140 which assembly is adapted for only vertical travel relative to the beam 140.

In the third embodiment, the rigid beam 140 includes a level sensor 141 and mounts a saddle 160 formed in an analgous manner to the saddle 14 of the first embodiment of the present invention. The saddle 160 includes a transport mechanism 162, sensor wheel 164, and sensor 166 which operates in a manner described in relation to the first embodiment of the present invention.

In operation, the third embodiment of the present invention is initially positioned upon the surface 11 desired to be measured and registered with the level reference plane optical source 106 as utilized in the second embodiment of the invention. Subsequently, the measurement run may be initiated by transport of the trolley 120, longitudinally along the length of the surface 11 and along the guide wire 143 with the contact wheels 142 and optical detector 148 operating as previously described. In this third embodiment, however, the level sensor 141 is utilized to provide an angle measurement for the rigid beam 140 which when processed with the height data obtained from the detector, yields a true longitudinal height profile along the length of the concrete surface 11, which is indicated upon the digital display 128 and recorded upon the printer/plotter 130.

In a step and repeat fashion, the saddle 162 may be transported transversely along the length of the rigid beam 140 whereby surface deviations are sensed by the sensor 166 mounted upon the trolley 126 and similarly communicated to the microprocessor 126 for digital processing, display, and printing. As will be recognized, the angle data obtained from the level sensor 141 during the longitudinal measurement run upon the surface 11 can now be used in processing of the transverse measurement data to yield an accurate height reading between the beam 140 and surface 11. Thus, during transport of the trolley 120 along the surface 11, a true profile height reading in both the longitudinal and transverse plane is obtained and recorded by the apparatus.

Those skilled in the art will recognize that although in the preferred embodiment specific manufactured components and sizes have been specified, variations in the same may easily be made and such variations are contemplated within the spirit of the present invention.

What is claimed is:

1. A device for accurately measuring surface heights comprising:
    a trolley having an axle affixed to said trolley adapted to be positioned upon a surface to be measured;
    an optical source positioned to define an optical reference datum adjacent said surface;
    detecting means for sensing said optical reference datum, said detecting means mounted to said axle of said trolley to vertically reciprocate in response to height difference on said surface;
    means responsive to said detecting means for maintaining said detecting means in registry with said reference datum during vertical reciprocation of said detecting means and generating a variable signal correlating to the magnitude of vertical receiprocation of said detecting means, said maintaining means mounted to said axle;
    means for transporting said trolley along said surface and generating a variable signal correlating to the position of said trolley along said surface; and
    means for processing said variable signals obtained from said maintaining means and said transporting means to yield a true height profile of said surface along the length of said surface.

2. The device of claim 1 further comprising:
    sensing means carried by said axle for contacting said surface and generating a variable signal in response to sensing the height difference between said axle and said surface;
    means for transporting said sensing means along the length of said axle and generating a variable signal in response to the position of said sensing means along the length of said axle; and
    means for processing said variable signals obtained form said axle sensing means and said axle transporting means to yield a true height profile of said surface along the length of said axle.

3. The device of claim 2 wherein said optical source is positioned to define a level optical reference datum adjacent said surface.

4. The device of claim 3 further comprising a level sensor mounted to said axle.

* * * * *